Aug. 7, 1956 L. E. BURNS 2,757,439

TRANSISTOR ASSEMBLIES

Filed Feb. 25, 1955

INVENTOR
LLOYD E. BURNS
BY Elmer J. Gorn
ATTORNEY

United States Patent Office 2,757,439

Patented Aug. 7, 1956

2,757,439

TRANSISTOR ASSEMBLIES

Lloyd E. Burns, Wellesley, Mass., assignor to Raytheon Manufacturing Company, Waltham, Mass., a corporation of Delaware Application February 25, 1955, Serial No. 490,612

2 Claims. (Cl. 29—25.3)

This invention relates generally to the construction and fabrication of electrical translation devices which utilize a semiconductive body as an essential element, and more particularly to an improved method of producing smaller, more compact units.

Recent developments in the electrical field have placed increasing emphasis on the use of semiconductive devices such as crystal diodes, rectifiers, transistors, and the like, depending for their operation on the flow of current through a body of semiconductor material provided with impurities which alter the electrical conductivity characteristics of the material. The semiconductor body is encapsulated in a protective housing with lead wires attached to the body, and extending through the housing to provide for external circuit connections. In order to support the lead wires and elements attached thereto during the encapsulating process, a stem base is provided in which the lead wires are embedded, the stem base being included in the completed package. Since a prime object in the manufacture of these devices resides in attempts to reduce their size and weight to a minimum, thereby resulting in reduced costs in manufacture, and facilitating the use of such devices in circumstances where weight and size are of vital importance, such as in aircraft installations, the inclusion of the stem base in the finished package represents an objectionable feature.

Accordingly, the present invention is directed toward an improved method of construction wherein the stem base may be readily eliminated from the completed device without sacrificing its utility as a positioning and holding agent.

The invention will be better understood as the following description proceeds, taken in conjunction with the accompanying drawing wherein.

Figure 1:
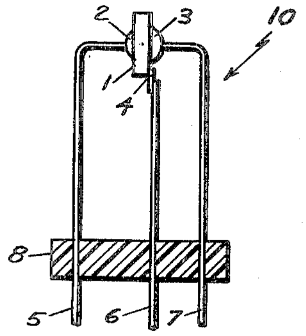
Fig. 1 is a sectional side view of a transistor prior to encapsulation.
Figure 2:
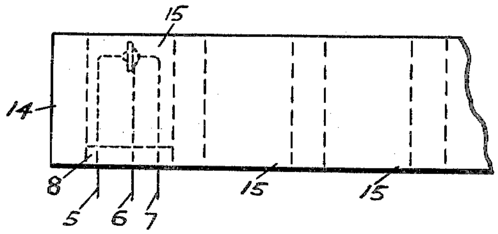
Fig. 2 is a side view of a mold assembly suitable for use in accordance with the invention.
Figure 3:
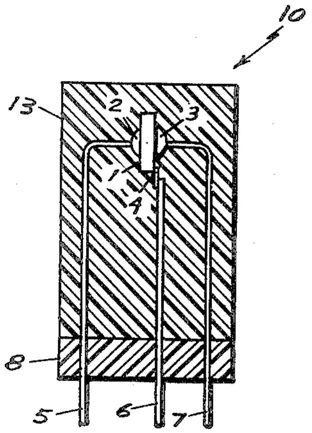
Fig. 3 is a sectional side view of transistor prior to removal of the stem base.
Figure 4:
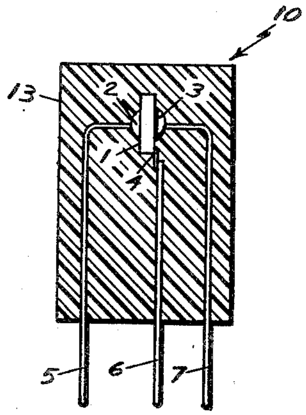
Fig. 4 is a sectional side view of a completed package.
Figure 5:
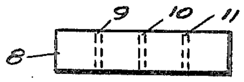
Fig. 5 is a side view of a stem base.
Figure 6:
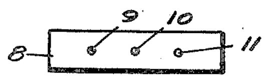
Fig. 6 is a top view of the stem base of Fig. 5.

Referring now to the drawing, and more particularly to Figs. 1 and 2 thereof, there is shown generally at 10 a transistor comprising a semiconductive body 1, which may be germanium, for example, having an emitter area 2, a collector area 3, and a base area 4 formed in accordance with principles well known in the art. A plurality of conducting lead wires 5, 6, and 7 are insulatedly connected, respectively, to the emitter 2, collector 3, and base 4, and extend through a stem base 8 in order to give mechanical support and rigidity to the device during the encapsulation process. As shown in Figs. 5 and 6, stem base 8 may comprise a rectangularly-shaped member provided with a plurality of holes 9, 10, and 11 for the reception of the conducting lead wires. In accordance with a preferred embodiment of the present invention, stem base 8 may be made of a material which exhibits non-adhesive properties, such as a polymeric fluorocarbon, and may be separately prepared, as by machining or casting.

After mounting the transistor 10 on the stem base 8, the unit may then be encapsulated in a protective housing or envelope 13. To accomplish this a plurality of units may be inserted in holes 15 in a resilient mold 14 with stem base 8 temporarily plugging one end of the holes as shown in Fig. 2. Holes 15 of mold 14 are filled with a suitable casting resin of plastic material, and allowed to harden. The completed transistor may then be taken from the mold, and stem base 8 readily slid off the lead wires, thus producing a smaller, more compact unit. In this way the stem base may be used repeatedly in the production process.

Although there has been described what is considered to be a preferred embodiment of the present invention, various adaptations and modifications thereof can be made without departing from the spirit and scope of the invention. For example, stem base 8 could be made of a fusible alloy, a chemically soluble substance, or glass which could be removed as by crushing. It is therefore desired that the appended claims be given a broad interpretation commensurate with the scope of the invention within the art.

What is claimed is:

1. The method of constructing a semiconductive device, said method comprising mounting a semiconductor body on a set of lead wires, insulatedly inserting said lead wires in a stem base, placing said stem base and attached element into a mold cavity with said stem base plugging one end of said cavity, sealing said cavity with an encapsulating material, causing said material to harden whereby a protective housing is formed around said leads and said body, and removing said stem base.

2. The method of constructing a semiconductive device, said method comprising mounting a transistor on a set of lead wires, insulatedly inserting said lead wires in a stem base, placing said stem base and attached element into a mold cavity with said stem base plugging one end of said cavity, sealing said cavity with an encapsulating material, causing said material to harden whereby a protective housing is formed around said leads and said body, and removing said stem base.

References Cited in the file of this patent

UNITED STATES PATENTS 2,586,609 Burke ---------------- Feb. 19, 1952